US012730410B2

(12) United States Patent
Lee et al.

(10) Patent No.: US 12,730,410 B2
(45) Date of Patent: Sep. 8, 2026

(54) DEVICE AND METHOD FOR PRINTING DUAL HOLOGRAPHIC

(71) Applicant: KWANGWOON UNIVERSITY INDUSTRY-ACADEMIC COLLABORATION FOUNDATION, Seoul (KR)

(72) Inventors: Seunghyun Lee, Namyangju-si (KR); Leehwan Hwang, Incheon (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 245 days.

(21) Appl. No.: 18/796,824

(22) Filed: Aug. 7, 2024

(65) Prior Publication Data

US 2025/0383628 A1 Dec. 18, 2025

(30) Foreign Application Priority Data

Jun. 18, 2024 (KR) ........................ 10-2024-0078678

(51) Int. Cl.
*G03H 1/26* (2006.01)

(52) U.S. Cl.
CPC ..... *G03H 1/268* (2013.01); *G03H 2001/2685* (2013.01); *G03H 2001/269* (2013.01); *G03H 2001/2695* (2013.01)

(58) Field of Classification Search
CPC ........... G03H 1/268; G03H 2001/2685; G03H 2001/269; G03H 2001/2695;

(Continued)

(56) References Cited

U.S. PATENT DOCUMENTS

| | | | |
|---|---|---|---|
| 6,266,167 B1 | 7/2001 | Klug et al. | |
| 2021/0191318 A1* | 6/2021 | Kick | G03H 1/26 |

FOREIGN PATENT DOCUMENTS

| | | |
|---|---|---|
| JP | 2012529078 A | 11/2012 |
| JP | 2017122897 A | 7/2017 |

(Continued)

OTHER PUBLICATIONS

Japanese Office Action for 2024-146235 mailed on Nov. 4, 2025.
European Search Report for 24193649.1 mailed Feb. 24, 2025.

*Primary Examiner* — Thomas K Pham
*Assistant Examiner* — Jennifer A Jones
(74) *Attorney, Agent, or Firm* — Perilla Knox & Hildebrandt LLP; Jason M. Perilla

(57) ABSTRACT

The present disclosure relates to a device for printing dual holographic, including a plurality of lasers that represents different wavelengths, a plurality of dichroic lenses and mirrors that combine beams output from the plurality of lasers into one beam and output the combined beam as a white beam, a plurality of beam splitters that separates the white beams output through the plurality of dichroic lenses and mirrors, transmit the separated white beams to a stereogram printing device, a wavefront printing device, and a reference beam, separates a beam heading to the reference beam, and transmits the separated beam to the stereogram printing device and the wavefront printing device, and a computer that controls the stereogram printing device and the wavefront printing device so that a hologram is printed with the beam transmitted through the beam splitters.

13 Claims, 5 Drawing Sheets

(58) Field of Classification Search
CPC ..... G03H 2001/048; G03H 2001/0482; G03H 1/0476; G03H 2210/22; G03H 2222/18; G03H 2222/34; G03H 2225/60; G03H 2001/0224; G03H 2222/12; G03H 2223/19; G03H 2223/24
See application file for complete search history.

(56) References Cited

FOREIGN PATENT DOCUMENTS

| | | | |
|---|---|---|---|
| JP | 2017129769 | A | 7/2017 |
| JP | 2017173379 | A | 9/2017 |
| KR | 1020220075116 | A | 6/2022 |

* cited by examiner

DEVICE AND METHOD FOR PRINTING DUAL HOLOGRAPHIC

CROSS-REFERENCE TO RELATED APPLICATIONS

This application claims the benefit of priority to Korean Patent Application No. 10-2024-0078678 filed on Jun. 18, 2024, in the Korean Intellectual Property Office, the entire disclosure of which is hereby incorporated herein by reference.

BACKGROUND

Field

The present disclosure relates to a holographic printing technology, and more particularly, to a device and method for printing dual holographic and a method for printing a multi-view image in a stereogram manner using Hogel by a single device or recording a wavefront reproduced from a computer-generated hologram (CGH).

Description of the Related Art

A hologram is an imaging technology that allows virtual reality to be recognized as reality. Much research and development are being conducted on the hologram. The hologram has been used in various fields. A method of producing a hologram includes splitting a beam from a laser, which is a light source, into two through a beam splitter, irradiating one beam to a reflector and the other beam to the subject, and recording an interference pattern, which is generated when light (object beam) diffusely reflected on the subject and light (reference beam) reflected from the reflector overlap, on a holographic medium.

A digital holographic printing technology may be largely divided into a holographic stereogram printing technology and a holographic wavefront printing technology. The holographic stereogram printing is made by configuring a multi-view image with parallax in vertical and horizontal directions as an object beam, forming an interference pattern with a reference beam, and recording the interference pattern on a photosensitive medium. Using this recording method, each hologram is printed as a unit hologram that acts as a lens. In other words, the recording method is a method of displaying a multi-view image using a holographic recording technology by acquiring a plurality of perspective projection images of a three-dimensional (3D) object and recording the acquired perspective projection images on a holographic recording medium. A holographic wavefront printer is a method of generating a holographic interference pattern for a 3D object and then recording a wavefront diffracted by the interference pattern on a holographic recording medium, and displaying the wavefront for a 3D object like an analog film hologram.

SUMMARY

An object to be achieved by the present disclosure is to provide a device and method for printing dual holographic that use a single device to record a multi-view image printed in a stereogram manner using a holographic element (Hogel) through a holographic stereogram printer and a wavefront reproduced from a computer generated hologram (CGH) recorded through a holographic wavefront printer.

Objects of the present disclosure are not limited to the above-mentioned objects. That is, other objects that are not mentioned may be obviously understood by those skilled in the art from the following description.

A device for printing dual holographic to an exemplary embodiment of the present disclosure includes a plurality of lasers that represents different wavelengths, a plurality of dichroic lenses and mirrors that combine beams output from the plurality of lasers into one beam and output the combined beam as a white beam, a plurality of beam splitters that separates the white beams output through the plurality of dichroic lenses and mirrors, transmits the separated white beams to a stereogram printing device, a wavefront printing device, and a reference beam, separates a beam heading to the reference beam, and transmits the separated beam to the stereogram printing device and the wavefront printing device, and a computer that controls the stereogram printing device and the wavefront printing device so that a hologram is printed with the beam transmitted through the beam splitters.

The plurality of lasers may include three first to third lasers that output beams of different wavelengths representing R, G, and B, and each of the first to third lasers may output beams having wavelengths of 660 nm, 532 nm, and 473 nm.

The device may further include a plurality of acousto-optic modulators that is disposed in front of the plurality of lasers, connected to the computer, and controlled by the computer.

The plurality of dichroic lenses may be disposed in front of each of the first and second lasers and pass the beams output from each of the first and second lasers to refract the beams in a specific direction, the mirror may be disposed in front of the third laser and reflect the beam output from the third laser in a specific direction, and the beam that passes through the plurality of dichroic lenses and the beam reflected by the mirror may be synthesized into one light.

The plurality of beam splitters may include a first beam splitter that splits the beam reflected through the mirror and transmits the split beam to the stereogram printing device, a second beam splitter that splits the beam passing through the first beam splitter and transmits the split beam to the wavefront printing device, and a third beam splitter that splits the beam that passes through the second beam splitter and transmits the reference beam to the stereogram printing device and the wavefront printing device, respectively.

The computer may control a first automatic ND filter and a first shutter of the stereogram printing device and a second automatic ND filter and a second shutter of the wavefront printing device to perform holographic stereogram printing or holographic wavefront printing.

In order for a first spatial light modulation device to perform the holographic stereogram printing, the computer may activate the first automatic ND filter among the deactivated first and second automatic ND filters to a maximum value, and activate the first shutter among the deactivated first and second shutters while displaying images corresponding to specific coordinates of Hogel which is an elemental hologram to expose a holographic medium to a light for a specific exposure time.

The computer may expose the holographic medium to the light for the specific exposure time, deactivate the first automatic ND filter and the first shutter, and then move an XY stage to record the elemental hologram at next coordinates of the specific coordinate.

In order for a second spatial light modulation device to perform the holographic wavefront printing, the computer may activate the second automatic ND filter among the deactivated first and second automatic ND filters to a maximum value, and activate the second shutter among the deactivated first and second shutters while displaying images corresponding to specific coordinates of an elemental hologram to for a specific exposure time.

The computer may expose the holographic medium to light for the specific exposure time, deactivate the second spatial light modulation device and the second shutter, and then move an XY stage to record an elemental hologram at next coordinates of the specific coordinate.

In order for the first and second spatial light modulation devices to perform the holographic stereogram printing and the holographic wavefront printing, the computer may activate the first automatic ND filter among the deactivated first and second automatic ND filters to a maximum value, and activate the first shutter among the deactivated first and second shutters while displaying images corresponding to specific coordinates of an elemental hologram to expose a holographic medium to a light for a specific exposure time.

The computer may expose the holographic medium to the light for the specific exposure time, deactivate the first spatial light modulation device and the first shutter, activate the second automatic ND filter among the deactivated first and second automatic ND filters to the maximum value, and activate the second shutter among the deactivated first and second shutters while displaying the images corresponding to the specific coordinates of the elemental hologram to expose the holographic medium to the light for the specific exposure time.

The computer may expose the holographic medium to the light for the specific exposure time, deactivate the second spatial light modulation device and the second shutter, and then move an XY stage to record an elemental hologram at next coordinates of the specific coordinate.

As described above, according to the present disclosure, by printing two types of holograms with a single device and implementing the conventional hologram printing device with a large volume into a single device, it is possible to save the manufacturing costs. As a result, it is possible to expand application possibilities in various industrial fields.

In addition, by using lasers of different wavelengths and processing the beam using one optical system, it is possible to selectively output the high-resolution and high-quality holograms required for the stereogram and wavefront printer. As a result, it is possible to develop more innovative and creative products by containing the images of detailed and complex designs that meet the needs of users.

In addition, by precisely controlling each process through the computer control system, it is possible to improve the work efficiency through the automated functions and reduce the possibility of errors in the manufacturing process. As a result, it is possible to improve the productivity and shorten the development time to accelerate the market entry of new products or technologies.

In addition, the present disclosure has the effect of being utilized in various application fields through the multi-functionality and high-resolution output capability. For example, in the medical field, the present disclosure can be used to generate the high-resolution medical images, and in the security field, it can be used to create safe and reliable holograms.

In addition, the present disclosure can be widely used in the field of research and development. For example, the present disclosure may be used in the experiment and evaluation of new materials or processes, in the exploration of new holographic application fields, etc. As a result, it is possible to lead to better understanding and innovative discoveries.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and aspects, features and other advantages of the present disclosure will be more clearly understood from the following detailed description taken in conjunction with the accompanying drawings, in which.

DETAILED DESCRIPTION OF THE EMBODIMENT

Figure 1:
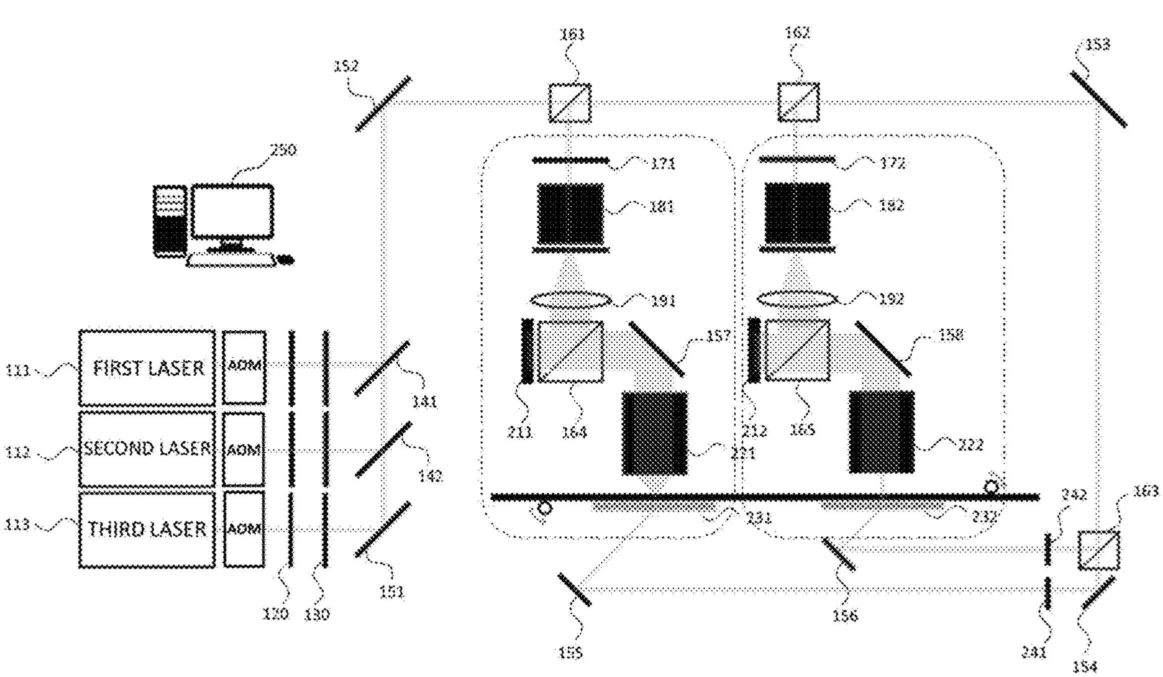
FIG. 1 is a block diagram of a device for printing dual holographic according to a preferred exemplary embodiment of the present disclosure.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Hereinafter, advantages and features of the present disclosure and methods for accomplishing these advantages and features will become apparent from exemplary embodiments to be described later in detail with reference to the accompanying drawings. However, the present disclosure is not limited to exemplary embodiments disclosed below, and may be implemented in various different forms, these exemplary embodiments will be provided only in order to make the present disclosure complete and allow one of ordinary skill in the art to which the present disclosure pertains to completely recognize the scope of the present disclosure, and the present disclosure will be defined by the scope of the claims. Throughout the specification, the same components will be denoted by the same reference numerals. "And/or" includes each and every combination of one or more of the mentioned items.

The terms 'first', 'second', and the like are used to describe various elements, components, and/or sections, but these elements, components, and/or sections are not limited by these terms. These terms are used only in order to distinguish one element, component, or section from another element, component or section. Accordingly, a first element, a first component, or a first section to be mentioned below may also be a second element, a second component, or a second section within the technical spirit of the present disclosure.

In addition, in each step, an identification code (for example, a, b, c, and the like) is used for convenience of description, and the identification code does not describe the order of each step, and respective steps may be different from the specified order unless the context clearly indicates a particular order. That is, the respective steps may be performed in the same sequence as the described sequence, be performed at substantially the same time, or be performed in an opposite sequence to the described sequence.

The terms as used herein are for describing exemplary embodiments rather than limiting the present disclosure. Unless explicitly described to the contrary, a singular form includes a plural form in the present specification. The word "comprises" and/or "comprising" used in the present specification will be understood to imply the inclusion of stated component, steps, operations and/or elements but not the exclusion of any other components, steps, operations and/or elements.

Unless defined otherwise, all the terms (including technical and scientific terms) used herein have the same meaning as meanings commonly understood by one of ordinary skill in the art to which the present disclosure pertains. In addition, the terms defined in generally used dictionaries are not ideally or excessively interpreted unless they are specifically defined clearly.

In addition, in describing exemplary embodiments of the present disclosure, when it is decided that a detailed description for well-known functions and configurations may unnecessarily obscure the gist of the present disclosure, the detailed description will be omitted. In addition, the following terms are terms defined in consideration of the functions in exemplary embodiments of the present disclosure, and may be construed in different ways by the intention of users and operators, customs, or the like. Therefore, the definitions thereof should be construed based on the contents throughout the specification.

FIG. 1 is a block diagram of a device for printing dual holographic according to a preferred exemplary embodiment of the present disclosure.

The device for printing dual holographic is a device that performs holographic stereogram printing and holographic wavefront printing in a single device, and may selectively perform the holographic stereogram printing or the holographic wavefront printing according to a user's request. In other words, the key to the device for printing dual holographic according to the present disclosure uses the same optical systems in the conventional technology of making the stereogram printing device and the wavefront printing device separately, making the stereogram printing device and the wavefront printing device dual and forming one X-Y stage. Referring to FIG. 1, the device for printing dual holographic includes a plurality of lasers 111 to 113, a plurality of waveplates 120 and 130, a plurality of dichroic lenses 141 and 142, a plurality of mirrors 151 to 158, and a plurality of beam splitters 161 and 165, and includes a stereogram printing device and a wavefront printing device.

Preferably, the stereogram printing device may include a first automatic ND filter 171, a spatial filter 181, a collimation lens 191, a first spatial light modulation device 211, a beam splitter 164, a mirror 157, a first optical head 221, and a holographic medium 231, and the wavefront printing device may include a second automatic ND filter 172, a spatial filter 182, a collimation lens 192, a second spatial light modulation device 212, a beam splitter 165, a mirror 158, a second optical head 222, and a holographic medium 232. Here, the stereogram printing device and the wavefront printing device differ in the configuration of the spatial light modulation device and the optical head, but the remaining configurations are the same. The configuration of the stereogram printing device 211 may display multi-view images, such as lenticulars, using a general LCD display, and the configuration of the wavefront printing device 212 may display CGH patterns using an SLM called a spatial light modulation device. In addition, the configuration of the stereogram printing device 221 may be designed so that the optical system focuses on the film, and the optical system of the configuration of the wavefront printing device 222 may be designed so that the optical system does not focus on the film and goes out in parallel with a small Hogel size.

The plurality of lasers 111 to 113 may include three coherence lasers that output beams of different wavelengths representing R, G, and B. For example, the first laser 111 may correspond to a coherence laser with a wavelength of 660 nm, the second laser 112 may correspond to a coherence laser with a wavelength of 532 nm, and the third laser 113 may correspond to a coherence laser with a wavelength of 457 nm.

The beams output from the first to third lasers 111 to 113 may pass through an acousto-optic modulator (AOM) disposed in front of each thereof and pass through a plurality of waveplates 120 and 130. Here, the AOM functions as a shutter that turns on/off by modulating the direction of light, and the plurality of waveplates 120 and 130 may be finely adjusted to set an optimal amount of light by changing a wavelength to reduce or increase the amount of light. In other words, when the hologram is recorded, high efficiency may be achieved only when the same polarization meets. The deformation of polarization may occur as various different optical components (e.g., lenses, mirrors, etc.) meet, and this deformation may be finely adjusted through the plurality of waveplates. Preferably, the plurality of waveplates 120 and 130 may include a waveplate 120 corresponding to ½λ and a waveplate 130 corresponding to ¼λ, and the waveplate 120 corresponding to ½λ and the waveplate 130 corresponding to ¼λ may be sequentially disposed in front of each of the first to third lasers 111 to 113.

The beams output from the first to third lasers 111 to 113 and passing through the plurality of waveplates 120 and 130 are synthesized into one beam through the plurality of dichroic lenses 141 and 142 and the mirror 151 disposed in front of the plurality of waveplates 120 and 130 and output as a white beam. Preferably, the beams output from the first and second lasers 111 and 112 may pass through the plurality of waveplates 120 and 130 and then be refracted in a specific direction through the dichroic lenses 141 and 142, and the beam output from the third laser 113 may pass through the plurality of waveplates 120 and 130 and then be reflected in a specific direction through the mirror 151. That is, the beams passing through the dichroic lenses 141 and 142 and the light reflected by the mirror 151 are synthesized into one light.

The white beam formed by being synthesized into one light changes direction through the mirror 152 and enters the first beam splitter 161. Preferably, the first beam splitter 161 splits a beam and transmits the beam to the stereo printing device, and the remaining separated beam is directed to the second beam splitter 162. The second beam splitter 162 splits a beam and transmits the beam to the wavefront printing device, and the remaining separated beam is directed to the third beam splitter 163 through the mirror 153. The third beam splitter 163 splits the beam into a reference beam entering the stereogram printing device and a reference beam entering the wavefront printing device. The reference beam entering the stereogram printing device is reflected by the mirror 154 and then passes through the first shutter 241, is reflected again by the mirror 155, and enters the stereogram printing device. The reference beam entering the wavefront printing device is split through the third beam splitter 163, passes through the second shutter 242, and then is reflected by the mirror 156 to enter the wavefront printing device.

Figure 2:
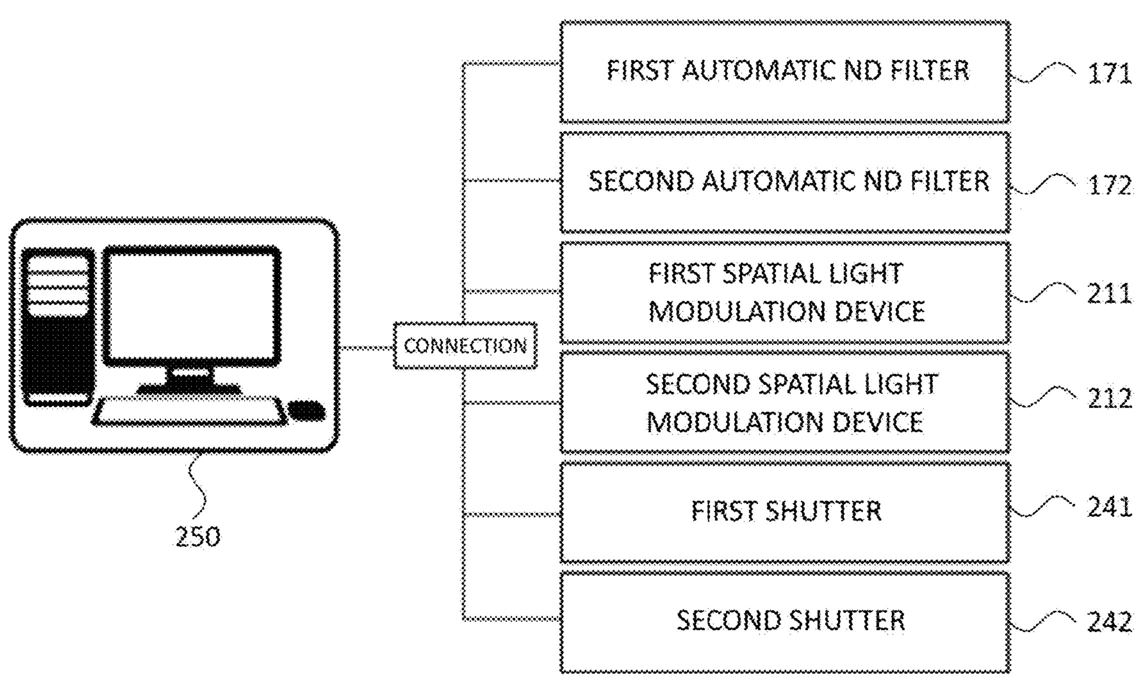
FIG. 2 is a diagram of a computer of a device for printing dual holographic according to an exemplary embodiment.

Preferably, the device for printing dual holographic may include a computer 250, and the computer 250 may control the stereogram printing device and the wavefront printing device so that the hologram is printed. That is, referring to FIG. 2, the computer 250 may be connected to first and second automatic ND filters 171 and 172, first and second spatial light modulation devices (SLMs) 211 and 212, and first and second shutters 241 and 242 to control the first automatic ND filter 171 and the first shutter 241 to perform the holographic stereogram printing in the first spatial light modulation device 211, and control the second automatic ND filter 172 and the second shutter 242 to perform the holographic wavefront printing in the second spatial light modulation device 212. The method of printing dual holographic performed through the computer 250 will be described in more detail with reference to FIGS. 3 to 5 below.

Preferably, the computer 250 may install and execute an application or program for performing the method of printing dual holographic, and includes a user interface to control input and output of data. Here, the computer 250 means all kinds of hardware devices including at least one processor, and may be understood as including a software configuration which is operated in the corresponding hardware device according to the exemplary embodiment. For example, the computer 250 may be understood as a meaning including all of smart phones, tablet PCs, desktops, laptops, and user clients and applications running on each device, but is not limited thereto.

In one exemplary embodiment, the detailed operation of the method of printing dual holographic performed through the computer 250 is as follows: the holographic stereogram printing is performed in the first optical head 221 and the holographic wavefront printing is performed in the second optical head 222. Here, the optical head is a set of multiple lasers that may be used to reduce incoming light to a desired size or form a focus at a desired location. When one or two lenses are used, a lot of aberrations will occur, so the first optical head 221 used in the stereogram printing device may be formed to well collect light from the incoming multi-view image to one location on the film, and the second optical head 222 used in the wavefront printing device may be formed so that the incoming CGH image is made parallel in the Hogel size and reaches one location on the film. Preferably, the computer 250 is capable of holographic printing corresponding to the following three cases. 1) It is possible to perform only the holographic stereogram printing, which will be described with reference to FIG. 3. 2) It is possible to perform only the holographic wavefront printing, which will be described with reference to FIG. 4. 3) It is possible to perform both the holographic stereogram printing and the holographic wavefront printing, which will be described with reference to FIG. 5.

Preferably, before the dual holographic printing is performed, all of the first to third lasers 111 to 113, the first and second automatic ND filters 171 and 172, the first and second spatial light modulation devices 211 and 212, and the first and second shutters 241 and 242 are initially set to be deactivated, the Hogel coordinates are defined as Hx and Hy, and the unit hologram coordinates are defined as Ex and Ey.

Figure 3:
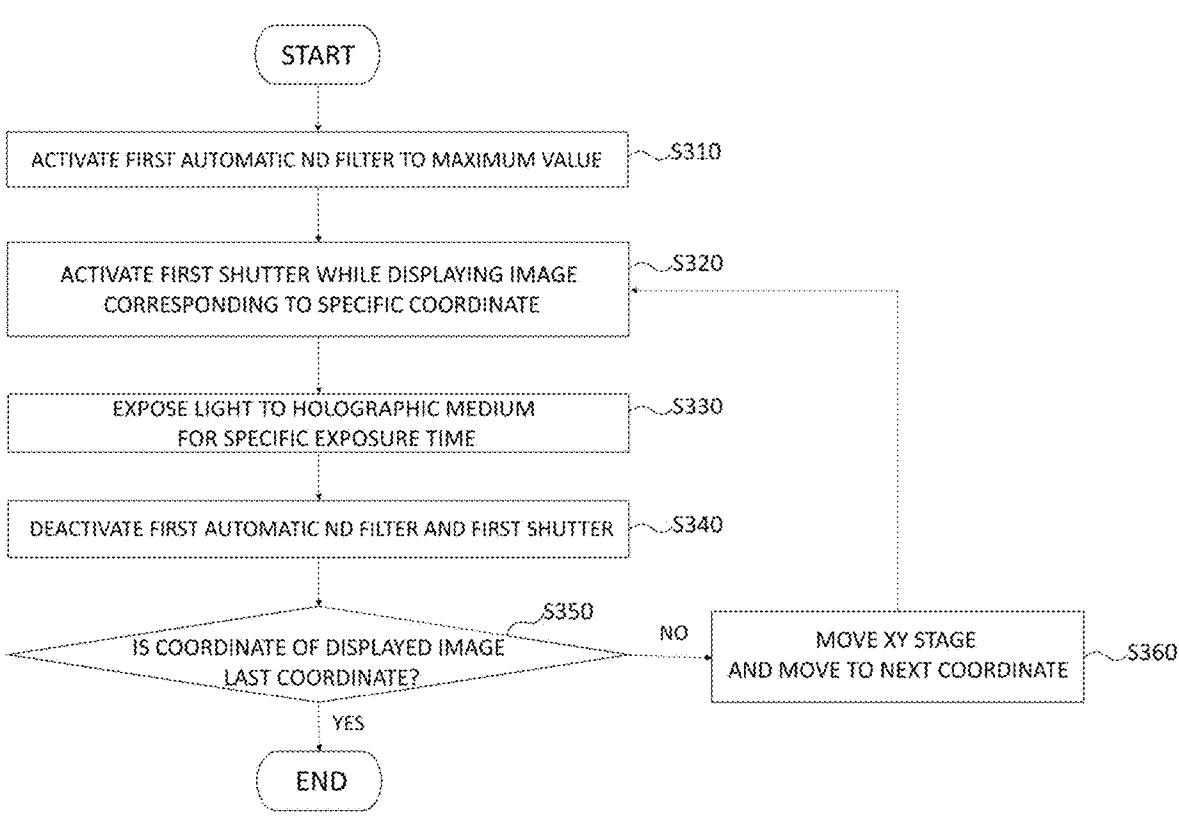
FIG. 3 is a flowchart for describing a method of printing dual holographic according to an exemplary embodiment.

FIG. 3 is a flowchart for describing a method of printing dual holographic according to an exemplary embodiment.

First, in preparation for recording a hologram, the first to third lasers 111 to 113 of the device for printing dual holographic are turned on, and the first and second automatic ND filters 171 and 172 are deactivated to completely block the light, and the first and second shutters 241 and 242 are also deactivated to prevent light from being exposed to the holographic media 231 and 232.

Figure 6:
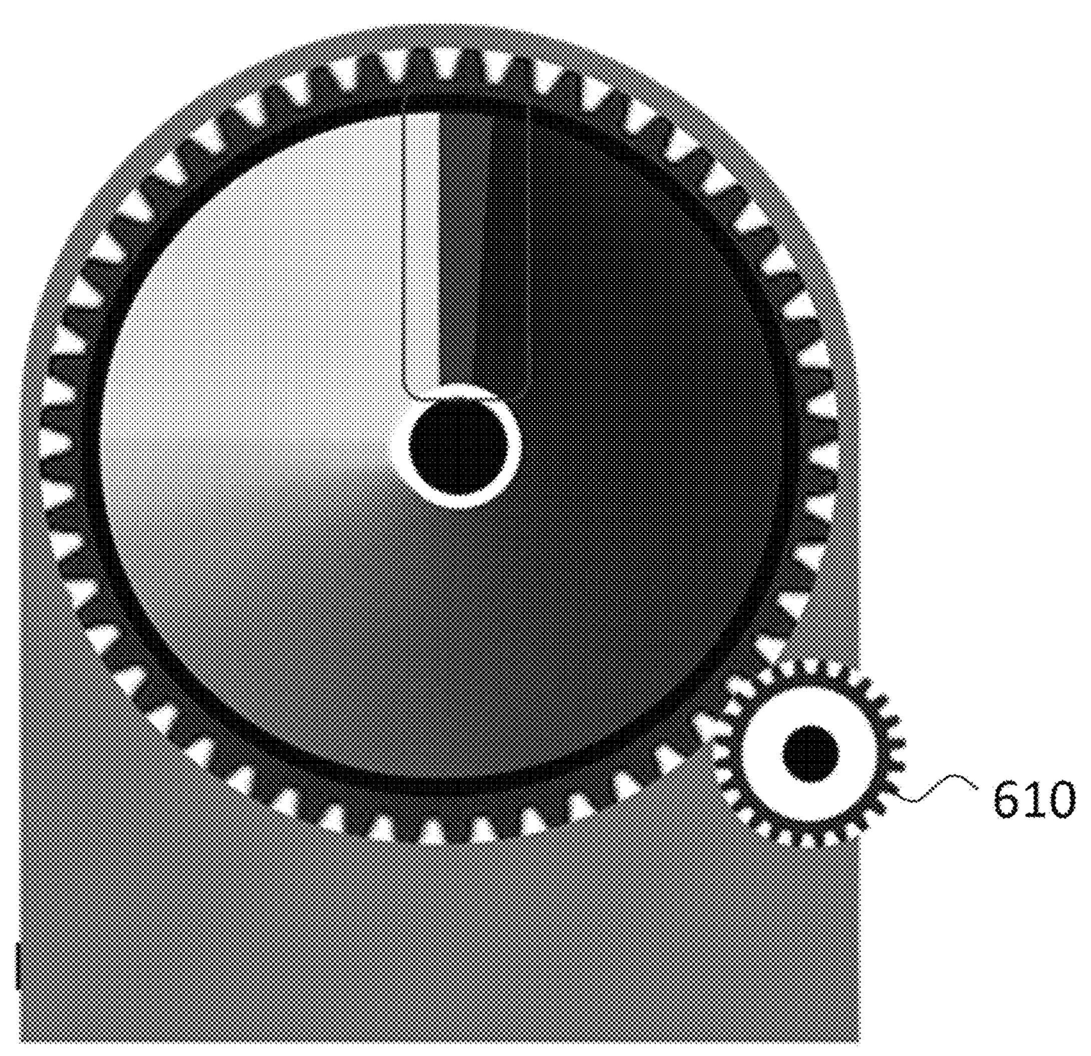
FIG. 6 is an exemplary diagram for describing an automatic ND filter according to an exemplary embodiment.

Referring to FIG. 3, in order for the first spatial light modulation device 211, which outputs the holographic stereogram image, to perform the stereogram printing, the computer 250 activates the first automatic ND filter 171 to the maximum value (step S310). Here, the first automatic ND filter 171 may reduce the amount of light entering the collimation lens 191 and automatically control the amount of light entering the first spatial light modulation device 211 to change from 0% to 100% under control of the computer 250. In addition, referring to FIG. 6, a portion marked with a red box is a portion that may completely block light, and the computer 250 drives the motor 160 of the first automatic ND filter 171 to activate the first automatic ND filter 171 to a maximum value. The same applies to the second automatic ND filter 172. When the ND filter does not reduce the amount of light during the wavefront printing, the light emitted from the stereogram printing device will interfere with the wavefront printing, and conversely, when the ND filter does not reduce the amount of light even during the stereogram printing, the light emitted from the wavefront printing device will interfere with the stereogram printing.

The computer 250 activates the first shutter 241 while displaying an image corresponding to specific coordinates Hx0 and Hy0 of Hogel which is an elemental hologram (step S320), and exposes light to the holographic medium 231 for a specific exposure time (step S330). Here, the first shutter 241 controls the reference beam to record the hologram and perform the holographic stereogram printing.

After exposing light to the holographic medium 231 for a specific exposure time, the computer 250 deactivates the first automatic ND filter 171 and the first shutter 241 (step S340).

The computer 250 checks whether the coordinates of the displayed image are last coordinates (step S350). When the coordinates of the displayed image are the last coordinates, the holographic stereogram printing is completed, and the operation is terminated. When the coordinates of the displayed image are not the last coordinates, the computer 250 moves the XY stage to the next coordinate to record the Hogel of the next coordinate (step S360), and repeatedly performs steps S320 to S340. In this way, the hologram is recorded from Hx0 and Hy0 to Hxn and Hyn.

Figure 4:
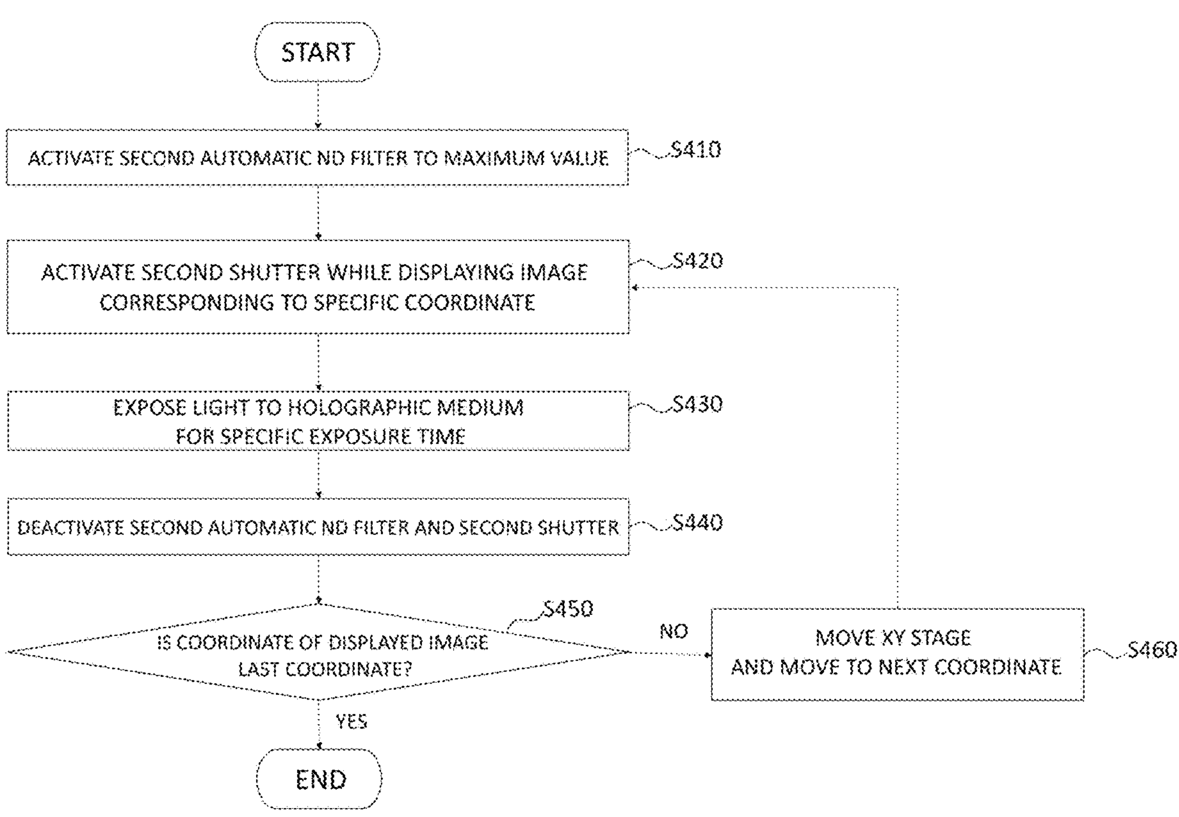
FIG. 4 is a flowchart for describing a method of printing dual holographic according to another exemplary embodiment.

FIG. 4 is a flowchart for describing a method of printing dual holographic according to another exemplary embodiment.

First, in preparation for recording a hologram, the first to third lasers 111 to 113 of the device for printing dual holographic are turned on, and the first and second automatic ND filters 171 and 172 are deactivated to completely block the light, and the first and second shutters 241 and 242 are also deactivated to prevent light from being exposed to the holographic media 231 and 232.

Referring to FIG. 4, in order for the second spatial light modulation device 212, which outputs the holographic wavefront stereogram image to perform the wavefront printing, the computer 250 activates the second automatic ND filter 172 to the maximum value (step S410). Here, the second automatic ND filter 172 may reduce the amount of light entering the collimation lens 192 and automatically control the amount of light entering the second spatial light modulation device 212 to change from 0% to 100% under the control of the computer 250.

The computer 250 activates the second shutter 242 while displaying an image corresponding to specific coordinates Ex0 and Ey0 of an elemental hologram (EH) that is a unit hologram (step S420), and exposes light to the holographic medium 232 for a specific exposure time (step S430). Here, the second shutter 242 controls the reference beam to record the hologram and perform the holographic wavefront printing.

After exposing light to the holographic medium 232 for a specific exposure time, the computer 250 deactivates the second automatic ND filter 172 and the second shutter 242 (step S440).

The computer 250 checks whether the coordinates of the displayed image are the last coordinates (step S450). When the coordinates of the displayed image are the last coordinates, the holographic wavefront printing is completed, and the operation is terminated. When the coordinates of the displayed image are not the last coordinates, the computer 250 moves the XY stage to record the unit hologram of the next coordinate and moves to the next coordinates (step S460), and repeatedly performs steps S420 to S440. In this way, the hologram is recorded from Ex0 and Ey0 to Exn and Eyn.

Figure 5:
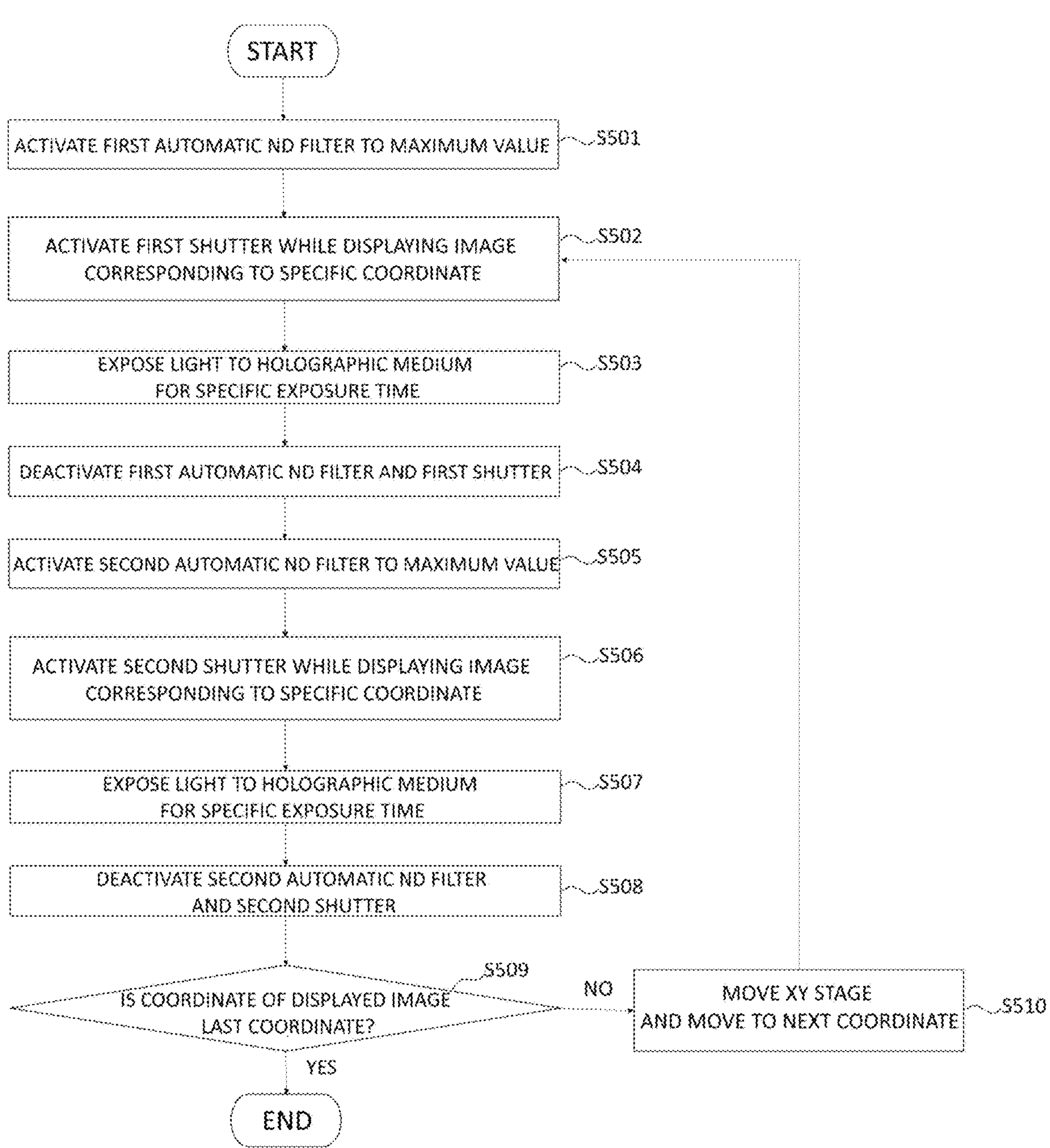
FIG. 5 is a flowchart for describing a method of printing dual holographic according to still another exemplary embodiment.

FIG. 5 is a flowchart for describing a method of printing dual holographic according to still another exemplary embodiment.

First, in preparation for recording a hologram, the first to third lasers 111 to 113 of the device for printing dual holographic are turned on, and the first and second automatic ND filters 171 and 172 are deactivated to completely block the light, and the first and second shutters 241 and 242 are also deactivated to prevent light from being exposed to the holographic media 231 and 232. When the stereogram printing and the wavefront printing are performed at the same time, after the stereogram hologram is recorded, the wavefront hologram is recorded, and then an operation of moving the stage to the next coordinates is performed.

Referring to FIG. 5, in order for the first spatial light modulation device 121 to perform the holographic stereogram printing, the computer 250 activates the first automatic ND filter 171 to the maximum value (step S501).

The computer 250 activates the first shutter 241 while displaying the images corresponding to the specific coordinates Hx0 and Hy0 of the Hogel which is the elemental hologram (step S502), and exposes light to the holographic medium 231 for the specific exposure time (step S503).

After exposing light to the holographic medium 231 for the specific exposure time, the computer 250 deactivates the first automatic ND filter 171 and the first shutter 241 (step S504).

In order for the second spatial light modulation device 122 to perform the holographic wavefront printing, the computer 250 activates the second automatic ND filter 172 to the maximum value (step S505).

The computer 250 activates the second shutter 242 while displaying the images corresponding to the specific coordinates Ex0 and Ey0 of the EH that is the unit hologram (step S506), and exposes light to the holographic medium 232 for the specific exposure time (step S507).

After exposing light to the holographic medium 232 for the specific exposure time, the computer 250 deactivates the second automatic ND filter 172 and the second shutter 242 (step S508).

The computer 250 checks whether the coordinates of the displayed image are the last coordinates (step S509). When the coordinates of the displayed image are the last coordinates, the holographic stereogram printing and the holographic wavefront printing are completed, and the operation is terminated, and when the coordinates of the displayed image are not the last coordinates, the XY stage is moved to the next coordinates (step S510), and steps S502 to S508 are repeatedly performed. In this way, the hologram is recorded from Hx0 and Hy0 to Hxn and Hyn and from Ex0 and Ey0 to Exn and Eyn.

Meanwhile, the steps of the method or the algorithm described in connection with an exemplary embodiment of the present disclosure may be implemented directly by hardware, by a software module executed by hardware, or by a combination of hardware and software. The software module may reside in a random access memory (RAM), a read only memory (ROM), an erasable programmable ROM (EPROM), an electrically erasable programmable ROM (EEPROM), a flash memory, a hard disk, a removable disk, a compact disc read-only memory (CD-ROM), or in any form of computer-readable recording media known in the art to which the present disclosure pertains.

The components of the present disclosure may be embodied as a program (or application) and stored in media for execution in combination with a computer which is hardware. The components of the present disclosure may be executed in software programming or software elements, and similarly, exemplary embodiments may be realized in a programming or scripting language such as C, C++, Java, and assembler, including various algorithms implemented in a combination of data structures, processes, routines, or other programming constructions. Functional aspects may be implemented in algorithms executed on one or more processors.

Although preferred exemplary embodiments of the device and method for printing dual holographic according to the present disclosure have been described above, the present disclosure is not limited thereto, and can be implemented with various modifications within the scope of the claims, the detailed description of the invention, and the accompanying drawings, and these also belong to the present disclosure.

What is claimed is:

1. A device for printing dual holographic, comprising:

a plurality of lasers that represents different wavelengths;

a plurality of dichroic lenses and mirrors that combine beams output from the plurality of lasers into one beam and output the combined beam as a white beam;

a plurality of beam splitters that separates the white beams output through the plurality of dichroic lenses and mirrors, transmits the separated white beams to a stereogram printing device, a wavefront printing device, and a reference beam, separates a beam heading to the reference beam, and transmits the separated beam to the stereogram printing device and the wavefront printing device; and a computer that controls the stereogram printing device and the wavefront printing device so that a hologram is printed with the beam transmitted through the beam splitters.

2. The device according to claim 1, wherein the plurality of lasers includes three first to third lasers that output beams of different wavelengths representing R, G, and B, and each of the first to third lasers outputs beams having wavelengths of 660 nm, 532 nm, and 473 nm.

3. The device according to claim 2, wherein the plurality of dichroic lenses is disposed in front of each of the first and second lasers and passes the beams output from each of the first and second lasers to refract the beams in a specific direction, the mirror is disposed in front of the third laser and reflects the beam output from the third laser in the specific direction, and the beam that passes through the plurality of dichroic lenses and the beam reflected by the mirror are synthesized into one light.

4. The device according to claim 1, further comprising:

a plurality of acousto-optic modulators that is disposed in front of the plurality of lasers, connected to the computer, and controlled by the computer.

5. The device according to claim 1, wherein the plurality of beam splitters includes:

a first beam splitter that splits the beam reflected through the mirror and transmits the split beam to the stereogram printing device;

a second beam splitter that splits the beam passing through the first beam splitter and transmits the split beam to the wavefront printing device; and a third beam splitter that splits the beam that passes through the second beam splitter and transmits the reference beam to the stereogram printing device and the wavefront printing device, respectively.

6. The device according to claim 1, wherein the computer controls a first automatic ND filter and a first shutter of the stereogram printing device and a second automatic ND filter and a second shutter of the wavefront printing device to perform holographic stereogram printing or holographic wavefront printing.

7. The device according to claim 6, wherein, in order for the holographic stereogram printing to be performed in a first spatial light modulation device, the computer activates the first automatic ND filter among the deactivated first and second automatic ND filters to a maximum value, and activates the first shutter among the deactivated first and second shutters while displaying images corresponding to specific coordinates of Hogel which is an elemental hologram to expose a holographic medium to a light for a specific exposure time.

8. The device according to claim 7, wherein after exposing the holographic medium to the light for the specific exposure time, the computer deactivates the first automatic ND filter and the first shutter, and then moves an XY stage to record the elemental hologram at next coordinates of the specific coordinate.

9. The device according to claim 6, wherein, in order to for the holographic wavefront printing to be performed in a second spatial light modulation device, the computer activates the second automatic ND filter among the deactivated first and second automatic ND filters to a maximum value, and activates the second shutter among the deactivated first and second shutters while displaying images corresponding to specific coordinates of an elemental hologram to expose a holographic medium to a light to for a specific exposure time.

10. The device according to claim 9, wherein after exposing the holographic medium to the light for the specific exposure time, the computer deactivates the second spatial light modulation device and the second shutter, and then moves an XY stage to record the elemental hologram at next coordinates of the specific coordinate.

11. The device according to claim 6, wherein, in order for the holographic stereogram printing and the holographic wavefront printing to be performed in a first and second spatial light modulation devices, the computer activates the first automatic ND filter among the deactivated first and second automatic ND filters to a maximum value, and activates the first shutter among the deactivated first and second shutters while displaying images corresponding to specific coordinates of an elemental hologram to expose a holographic medium to a light for a specific exposure time.

12. The device according to claim 11, wherein after exposing the holographic medium to the light for the specific exposure time, the computer deactivates the first spatial light modulation device and the first shutter, activates the second automatic ND filter among the deactivated first and second automatic ND filters to the maximum value, and activates the second shutter among the deactivated first and second shutters while displaying images corresponding to specific coordinates of an elemental hologram to expose a holographic medium to a light for a specific exposure time.

13. The device according to claim 12, wherein after exposing the holographic medium to the light for the specific exposure time, the computer deactivates the second spatial light modulation device and the second shutter, and then moves an XY stage to record the elemental hologram at next coordinates of the specific coordinate.

* * * * *